(12) United States Patent
Dolim et al.

(10) Patent No.: US 9,380,295 B2
(45) Date of Patent: Jun. 28, 2016

(54) NON-LINEAR NAVIGATION OF A THREE DIMENSIONAL STEREOSCOPIC DISPLAY

(71) Applicant: zSpace, Inc., Sunnyvale, CA (US)

(72) Inventors: Scott M. Dolim, Mountain View, CA (US); Cisco Lopez-Fresquet, Los Gatos, CA (US)

(73) Assignee: zSpace, Inc., Sunnyvale, CA (US)

( * ) Notice: Subject to any disclaimer, the term of this patent is extended or adjusted under 35 U.S.C. 154(b) by 305 days.

(21) Appl. No.: 14/257,854

(22) Filed: Apr. 21, 2014

(65) Prior Publication Data

US 2014/0313295 A1    Oct. 23, 2014

Related U.S. Application Data

(60) Provisional application No. 61/814,319, filed on Apr. 21, 2013.

(51) Int. Cl.
*H04N 13/04* (2006.01)
*G06F 3/01* (2006.01)

(52) U.S. Cl.
CPC ............. *H04N 13/0468* (2013.01); *G06F 3/01* (2013.01)

(58) Field of Classification Search
IPC .................................................. H04N 13/0472
See application file for complete search history.

(56) References Cited

U.S. PATENT DOCUMENTS

| | | | | |
|---|---|---|---|---|
| 6,296,613 | B1 * | 10/2001 | Emmenegger | A61B 8/12 128/916 |
| 7,376,903 | B2 | 5/2008 | Morita | |
| 2002/0084974 | A1 * | 7/2002 | Ohshima | A63F 13/00 345/156 |
| 2003/0017872 | A1 * | 1/2003 | Oishi | A63F 13/10 463/33 |
| 2005/0007553 | A1 * | 1/2005 | Romanoff | B66F 11/048 352/243 |
| 2006/0197832 | A1 * | 9/2006 | Yamada | G02B 27/017 348/77 |
| 2007/0252832 | A1 * | 11/2007 | Ratai | G02B 27/0093 345/427 |
| 2008/0143895 | A1 | 6/2008 | Peterka | |

(Continued)

OTHER PUBLICATIONS

Laviola, Joseph J. Jr., et al. "The Influence of Head Tracking and Stereo on User Performance with Non-Isomorphic 3D Rotation," EGVE'08 Proceedings of the 14th Eurographics Conference on Virtual Environments, pp. 111-118, May 29, 2008, The Eurographics Association, Aire-la-Ville, Switzerland (8 pages).

(Continued)

*Primary Examiner* — Tracy Li
(74) *Attorney, Agent, or Firm* — Meyertons Hood Kivlin Kowert & Goetzel, P.C.; Jeffrey C. Hood; Brian E. Moore

(57) ABSTRACT

Systems and methods for navigating a 3D stereoscopic scene displayed via a 3D stereoscopic display system using user head tracking. A reference POV including a reference user head position and a reference user head orientation may be established. The user head POV may be tracked, including monitoring user head positional displacements and user head angular rotations relative to the reference POV. In response to the tracking, a camera POV used to render the 3D stereoscopic scene may be adjusted based on a non-linear mapping between changes in the camera POV and the user head positional displacements and user head angular rotations relative to the reference POV. The non-linear mapping may include a mapping of user head positional displacements relative to the reference POV to translational movements in the camera POV and a mapping of user head angular rotations relative to the reference POV to rotations in the camera POV.

20 Claims, 6 Drawing Sheets

(56) References Cited

U.S. PATENT DOCUMENTS

| | | | | |
|---|---|---|---|---|
| 2012/0259638 | A1* | 10/2012 | Kalinli | G10L 15/25 704/270 |
| 2013/0016129 | A1* | 1/2013 | Gossweiler III | G06F 3/012 345/667 |
| 2013/0114850 | A1* | 5/2013 | Publicover | G06K 9/00604 382/103 |
| 2013/0120224 | A1* | 5/2013 | Cajigas | G09G 5/00 345/8 |
| 2013/0249791 | A1* | 9/2013 | Pryor | G06F 3/042 345/156 |

OTHER PUBLICATIONS

Bowman, Doug A. et al., BOOK: 3D User Interfaces: Theory and Practice, Jul. 26, 2004, Addison-Wesley Longman Publishing Co., Inc., Redwood City, CA, United States (80 pages).

Laviola, Joseph J. Jr., et al. "An Exploration of Non-Isomorphic 3D Rotation in Surround Screen Virtual Environments," Proceedings of the IEEE Symposium on 3D User Interfaces 2007, Mar. 10-11, 2007, pp. 49-54, (6 pages).

\* cited by examiner

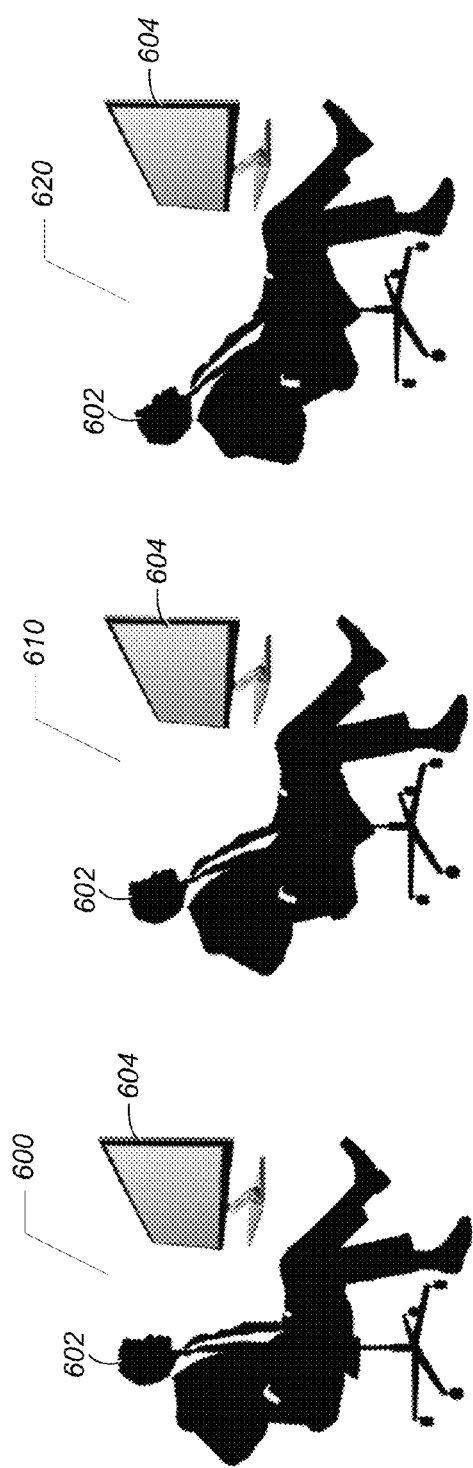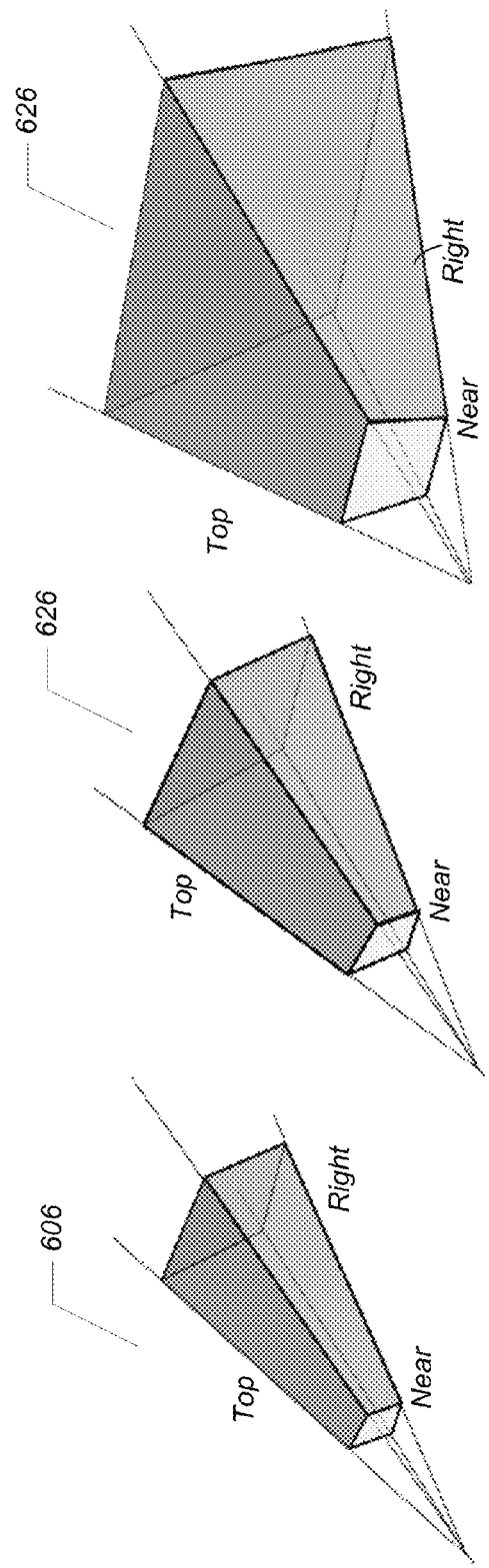
FIG. 5A  FIG. 5B  FIG. 5C

NON-LINEAR NAVIGATION OF A THREE DIMENSIONAL STEREOSCOPIC DISPLAY

PRIORITY DATA

This application claims benefit of priority to U.S. Provisional Application Ser. No. 61/814,319, titled "Non Linear Navigation", filed Apr. 21, 2013, whose inventors are Scott M. Dolim and Cisco Lopez-Fresquet, which is hereby incorporated by reference in its entirety as though fully and completely set forth herein.

TECHNICAL FIELD

This disclosure relates to the field of digital display, and more particularly to non-linear navigation of a 3D scene via user head movements.

DESCRIPTION OF THE RELATED ART

Three dimensional (3D) displays (actually, simulated 3D, e.g., via stereo display (SD) techniques) are increasingly utilized for a variety of applications, including, for example, remote viewing, videoconferencing, video collaboration, and so forth.

FIG. 1 illustrates a modern display chain, according to typical prior art embodiments, which includes the following components:

1. GPU—Graphics Processing Unit. This component resides on a personal computer, workstation, or functional equivalent, and outputs video levels for each color or channel of a supported color model, e.g., for each of three colors, typically Red (R), Green (G), and Blue (B), for each pixel on the display. Each of these numbers is typically an 8 bit number, with a range of 0 to 255, although other ranges are possible.

2. Scaler—This component takes as input the video levels (e.g., for R, G, and B) for each pixel output from the GPU, and processes them in various ways, before outputting (usually) modified video levels for RGB, usually in the same 8-bit range of 0-255.

3. Panel—This component is the display itself, typically a liquid crystal display (LCD), but other displays are possible, and takes as input the video levels (e.g., for R, G and B) for each pixel as output from the scaler, and converts them to voltages, which are then delivered to each pixel on the display. The panel itself may modify the video levels before converting them to voltages.

The video chain generally modifies the video levels in two ways that have associated shortcomings for stereo displays, specifically, gamma correction, and overdrive. Note that the functionality described above is typically implemented in the scaler, but is sometimes implemented at least partially in other devices or elements of the video chain, e.g., in the GPU or display device (panel).

Time Sequential Stereo Displays

Unlike a normal display, in a stereo display, for each video frame there are two images—right and left. The right image must be delivered to only the right eye, and the left image must be delivered to only the left eye. In a time sequential stereo display, this separation of right and left images is performed in time, i.e., the left and right images are presented sequentially, and thus, contains some time-dependent element which separates these two images. There are two common architectures.

The first architecture uses a device called a polarization switch (PS) which may be a distinct (separate) or integrated LC device or other technology switch, which is placed in front of the LCD panel (or any other type of imaging panel, e.g., an OLED (organic light emitting diode) panel), a plasma display, etc., or any other pixelated panel display used in a time-sequential stereo imaging system, specifically, between the display panel and the viewer, as shown in FIG. 2. The purpose of the PS is to switch the light transmitted from the display panel between two orthogonal polarization states. For example, one of these states may be horizontally linearly polarized light (horizontal linear polarization state), and the other may be vertically linearly polarized light (vertical linear polarization state); however, other options are possible, e.g., left and right circular polarization states, etc., the key feature being that the two polarization states are orthogonal.

This allows achievement of the stereo effect shown in prior art FIG. 3. As may be seen, the top portion of the figure shows the (display) panel switching between a left image and a right image. Synchronous with the panel switching, the PS is switching between a Left State and a Right State, as shown. These two states emit two corresponding orthogonal polarization states, as mentioned above. As FIG. 3 further shows, the system includes stereo eyewear that is designed such that the left lens will only pass the Left State polarization and the right lens will only pass the Right State polarization. In this way, separation of the right and left images is achieved.

The second conventional architecture uses stereo shutter glasses, which replace (or integrate the functionality of) the PS and eyewear. In such systems, each eye is covered by an optical shutter, which can be either open or closed. Each of these shutters is opened and closed synchronously with the display panel in such a way that when the left image is shown on the display, only the left eye shutter is open, and when the right image is shown on the display, only the right eye shutter is open. In this manner, the left and right views are (alternatingly) presented to the user's left and right eyes, respectively.

Interaction with the 3D Display System

Recent advances in body tracking systems allow for new mechanisms to track the position of a user. In particular, it has become more prevalent to track the position of the user's head as the user interacts with a 3D scene displayed on a display screen of a stereoscopic 3D display system. Better knowledge of the position of the user's head has led to new ways for the user to interact with the display. For example, the user's head position, and more particularly, changes in the user's head position, may be used to effect navigation through, and rendering of, a virtual 3D scene.

In particular, the user's head position may be close to the screen or far away from the screen. Additionally, the virtual 3D scene may have objects rendered at various depths within a view volume (frustum) relative to the user's point of view. Thus, for example, objects may be rendered to appear in front of the display screen (negative parallax), near the display screen (near zero parallax), or behind the display screen (positive parallax). However, depending on the position of the objects relative to the user's point of view, the stereo conditions may cause the imagery to be distorted or uncomfortable to the view because of excessive positive or negative parallax, depth of scene, and foreground (nearest to the user) artifacts resulting from near plane clipping.

Thus, improved techniques for interacting with 3D stereoscopic displays are desired.

SUMMARY

Various embodiments of a system and method for navigating a three dimensional (3D) stereoscopic scene displayed via a 3D stereoscopic system are presented. The system may include a processor or functional unit, a display screen, and a user control element. The functional unit may be configured to perform user head tracked navigation of the 3D scene. Further, in some embodiments, a memory medium may store programming instructions executable by a processor to perform user head tracked navigation of the 3D scene.

Thus, in one embodiment a user head tracking navigation mode of a 3D stereoscopic system may be enabled, either at startup of the 3D stereoscopic system or through some form of user interaction that may trigger startup of the head tracking navigation mode. The trigger may be selection of the head tracking navigation mode via a user interface displayed within a 3D scene, such as a menu. Additionally, the trigger may be external to the 3D scene. Thus, the trigger may be via a user control element such as a switch or button of the user control element. The user control element may be a stylus. Note that the system may include more than one trigger.

Once the head tracking navigational mode has been enabled, a reference point of view (POV) may be established. The reference POV may include a reference user head position and a reference user head orientation. Further, user head POV may be tracked. Tracking the user's head POV may monitor user head positional displacements and user head angular rotations relative to the reference POV.

In response to tracking the user's head POV, a camera POV used to render the 3D stereoscopic scene may be adjusted. The adjustment may be based on a non-linear mapping between changes in the camera POV and the user head positional displacements and user head angular rotations relative to the reference POV. The camera POV may correspond, or correlate to, a frustum, or frustum field of view angle, used to render the 3D stereoscopic scene.

The non-linear mapping may include a mapping of user head positional displacements relative to the reference POV to translational movements in the camera view. Further, the non-linear mapping may include a mapping of user head angular rotations relative to the reference POV to rotations in the camera POV. In some embodiments, the mapping may also include a mapping of rate of change of user head positional displacements relative to the reference POV to rate of change of translational movements in the camera POV and a mapping of rate of change of user head angular rotations relative to the reference POV to rate of change of rotations in the camera POV.

In one particular embodiment, adjusting the camera POV may also include adjusting one or more 3D stereoscopic rendering variables. In such embodiments, the adjustment may also be based on a non-linear mapping of each of the one or more 3D stereoscopic rendering variables to the camera POV, where the 3D stereoscopic rendering variables may include a world scale variable, a stereo level variable, a zero parallax offset variable, and a head-tracking scale variable.

Note that in some embodiments, the mapping may be performed via a correlated table of mapped variables. In other embodiments, the mapping may be performed via a continuous function. In certain embodiments, the mapping may be performed via a discontinuous function.

BRIEF DESCRIPTION OF THE DRAWINGS

A better understanding of the present disclosure can be obtained when the following detailed description of the preferred embodiment is considered in conjunction with the following drawings, in which:

FIGS. 5A-5C illustrate changes to a frustum based on changes in user POV according to embodiments;

Figure 1:
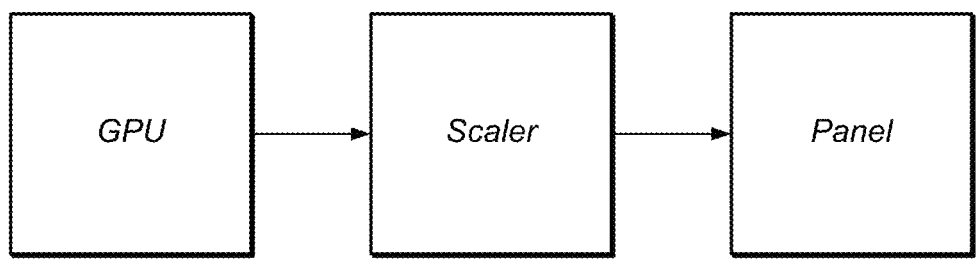
FIG. 1 illustrates a modern display chain, according to the prior art.
Figure 2:
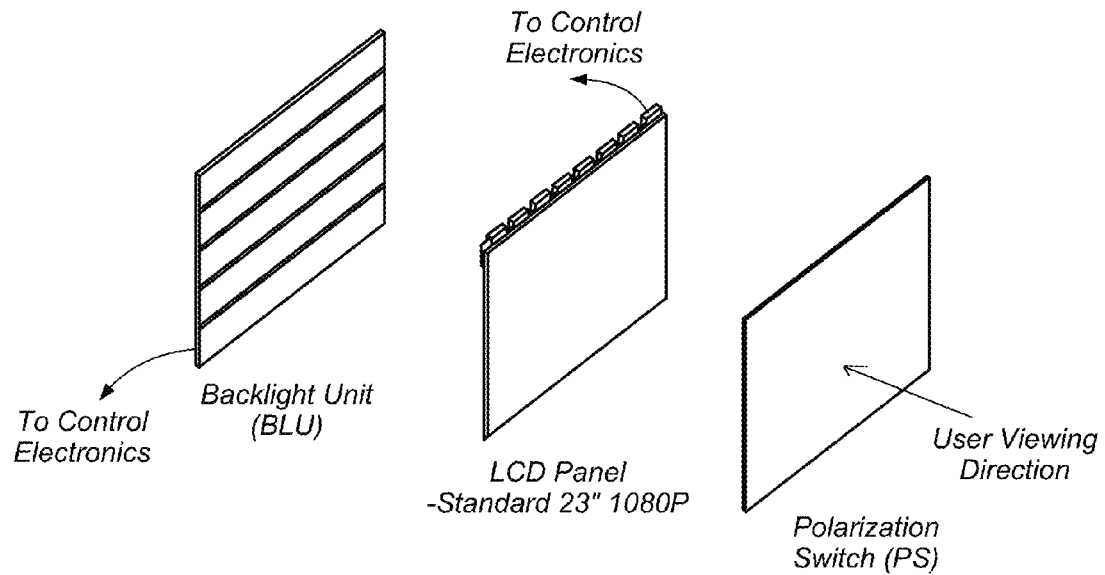
FIG. 2 illustrates an architecture that utilizes a polarization switch, according to the prior art.
Figure 3:
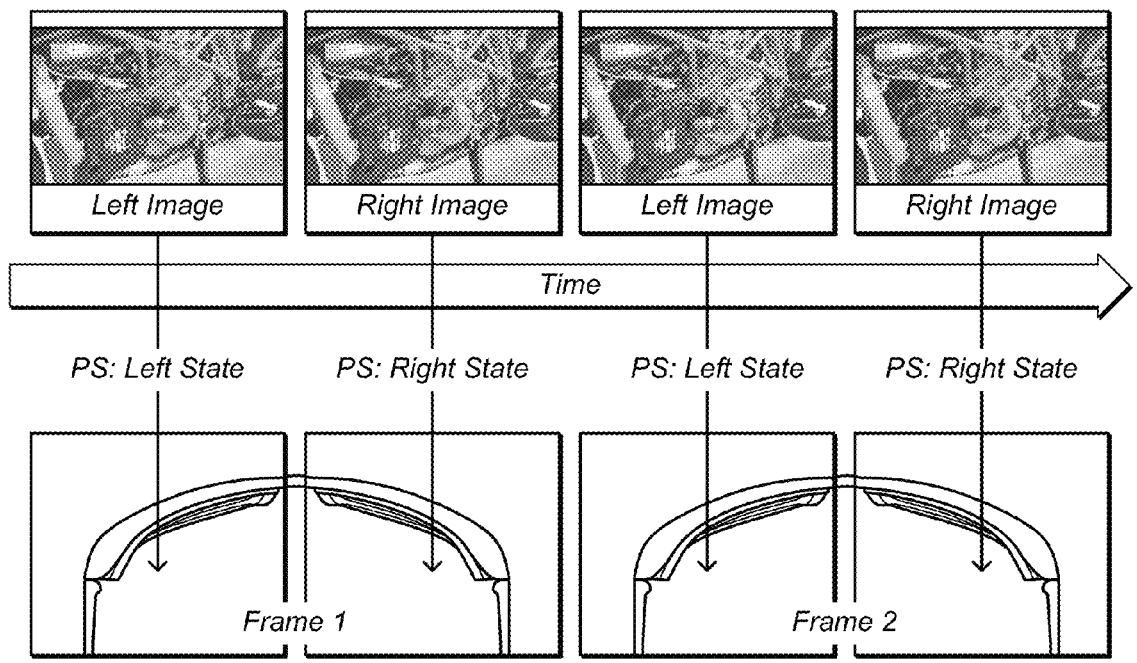
FIG. 3 illustrates a stereo effect (simulated 3D) using polarization switching between left and right views, according to the prior art.

Although the invention is susceptible to various modifications and alternative forms, specific embodiments thereof are shown by way of example in the drawings and are herein described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION

Terms

The following is a glossary of terms used in the present application:

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Memory Medium—any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, EEPROM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), smart phone, television system, grid computing system, or other device or combinations of devices. In general, the term "computer system" can be broadly defined to encompass any device (or combination of devices) having at least one processor that executes instructions from a memory medium.

Graphical Processing Unit—refers to a component that may reside on a personal computer, workstation, or equivalent, and outputs video levels for each color or channel of a supported color model, e.g., for each of three colors, typically Red (R), Green (G), and Blue (B), for each pixel on the display. Each of these numbers is typically an 8 bit number, with a range of 0 to 255, although other ranges are possible.

Functional Unit (or Processing Element)—refers to various elements or combinations of elements configured to process instructions and/or data. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Projection—refers to the rendering of a 3D object, or content, using a display device such as a 3D stereoscopic system display on a two dimensional (2D) display. Thus, a projection may be described as the mathematical function applied to objects within a virtual 3D scene to determine the virtual position of the objects within a 3D space that may be defined by the size of the and the point of view or perspective of a user.

Viewpoint—This term has the full extent of its ordinary meaning in the field of computer graphics/cameras and specifies a location and/or orientation. For example, the term "viewpoint" may refer to a single point of view (e.g., for a single eye) or a pair of points of view (e.g., for a pair of eyes). Thus, viewpoint may refer to the view from a single eye, or may refer to the two points of view from a pair of eyes. A "single viewpoint" may specify that the viewpoint refers to only a single point of view and a "paired viewpoint" or "stereoscopic viewpoint" may specify that the viewpoint refers to two points of view (and not one). Where the viewpoint is that of a user, this viewpoint may be referred to as an eyepoint (see below) or "physical viewpoint". The term "virtual viewpoint" refers to a viewpoint from within a virtual representation or 3D scene. A viewpoint is synonymous with "point of view" (POV). (See definition of POV below.)

Eyepoint—the physical location (and/or orientation) of a single eye or a pair of eyes. A viewpoint above may correspond to the eyepoint of a person. For example, a person's eyepoint has a corresponding viewpoint.

Point of View (POV)—a position and orientation. For example, a POV may be a viewpoint or eyepoint, generally of a user, but may also be a viewpoint of an optical device, such as a camera. The POV is generally a means to capture a relationship between two or more 6 degree of freedom objects. In a typical application of the present techniques, a user's pair of eyes or head (view) are positioned in any X, Y, Z position and/or pitch, yaw, roll orientation to a display device, e.g., a monitor screen, which may have its own position in any X, Y, Z position and/or pitch, yaw, roll orientation. In this example, the POV can be defined as the position/orientation of the user's view with respect to the positioning/orientation of the display device. The POV determination may be identified by a capture system. In a typical application of the present techniques, one or more tracking devices are attached to the display device, such that the controller knows what the tracking system tracks in the context of the display device, meaning the tracking system, being attached to the display device, is programmatically aware of the position/orientation of the display device, as well as any potential change to the position/orientation of the display device.

The tracking device (which is identifying and tracking the user's view) identifies the position/orientation of the user's view, and this information is then correlated to the tracking system's identification of the viewing device's position/orientation (again, with respect to the display device).

Frustum—refers to the region of virtual space that may be rendered by a stereoscopic 3D display system. May be also referred to as the viewing frustum or view frustum. Although the shape of the region may vary based on the type of camera lens simulated, a frustum is generally the shape of a rectangular pyramid. The planes that cut the frustum perpendicular to the viewing direction may be referred to as the near plane and the far plane.

Coupled Zone—refers to a physical volume in which the user of a 3D stereoscopic system may view 3D content within the human eye's natural depth of field. Put another way, the "coupled zone" of a 3D stereoscopic display may refer to volume defined by a user's viewing angle, the size of the 3D stereoscopic display, and the distances in front of and behind the 3D display in which a user may view objects for an extended period of time without developing eye strain. Thus, the coupled zone of a particular 3D stereoscopic display may also be referred to as the "comfort zone" of the particular 3D stereoscopic display, i.e., the physical volume in which a user may view virtual images for an extended period of time without experiencing eye strain, and thus, discomfort.

Note that in the physical world, when a person sees an object, the person's eyes converge on, or look (individually aim) at, the object. Additionally, as the two eyes converge on the object, each eye's lens also focuses (monoscopically) on the object. In this sense, both eyes focus and converge on the object, thus focus and convergence are "coupled."

In contrast, when looking at a display of 3D stereoscopic system, focus must always remain on the display, whereas the eyes must converge at various depths in order to visualize, or see, the 3D illusion. Thus, focus and convergence appear to "de-couple." Note that when focus and convergence de-couple, eye strain may develop if focus and convergence remain de-coupled for a period of time which may lead to discomfort for the viewer.

Vertical Perspective—a perspective which is rendered for a viewpoint which is substantially perpendicular to the display surface. "Substantially perpendicular" may refer to 90 degrees or variations thereof, such as 89 and 91 degrees, 85-95 degrees, or any variation which does not cause noticeable distortion of the rendered scene. A vertical perspective may be a central perspective, e.g., having a single (and central) vanishing point. As used herein, a vertical perspective may apply to a single image or a stereoscopic image. When used with respect to a stereoscopic image (e.g., presenting a stereoscopic image according to a vertical perspective), each image of the stereoscopic image may be presented according to the vertical perspective, but with differing single viewpoints.

Horizontal or Oblique Perspective—a perspective which is rendered from a viewpoint which is not perpendicular to the display surface For example, the term "horizontal perspective" may refer to a perspective which is rendered using a substantially 45 degree angled render plane in reference to the corresponding viewpoint. The rendering may be intended for a display which may be positioned horizontally (e.g., parallel to a table surface or floor) in reference to a standing viewpoint. "Substantially 45 degrees" may refer to 45 degrees or variations thereof, such as 44 and 46 degrees, 40-50 degrees. Similarly, an oblique perspective may refer to any angle that in not vertical or horizontal. As used herein, a horizontal perspective may apply to a single image or a stereoscopic image. When used with respect to a stereoscopic image (e.g., presenting a stereoscopic image according to a horizontal perspective), each image of the stereoscopic image may be presented according to the distinct horizontal perspective, but with differing single viewpoints.

Another conception of the horizontal perspective as commonly used in this invention is the projection of the intended rendered graphics to the viewing device. With the POV determined, a horizontal or oblique perspective engine may identify the correct graphics frustum in the 3D space, taking into account the position and orientation of the viewing device as defining position and orientation of the render plane of the frustum and the user's view in position and orientation to define camera point of the frustum in relation to the render plane. The resultant projection is then rendered onto the viewing device to be seen by the user.

Position—the location or coordinates of an object (either virtual or real). For example, position may include x, y, and z coordinates within a defined space. The position may be relative or absolute, as desired. Position may also include yaw, pitch, and roll information, e.g., when defining the orientation of a viewpoint.

Stylus—peripheral devices or user control elements such as a handheld device, handheld pen device, handheld pointing device, hand, finger, glove, or any object used to directly interact with rendered virtual objects as in a stereo rendered virtual projected objects.

World Scale—refers to a multiplier used to scale the entire 3D scene being rendered. In general, either the scene objects are scaled within a given frustum or the frustum is scaled with a constant set of scene objects.

Stereo Level—refers to a percentage multiplier of the stereo effect. For example, a 0.50 stereo level would reduce the parallax—both positive and negative—by half.

Field of View—refers to the angle between two rays each starting at the viewer's head position, and passing through the left and right edges of the screen.

Zero Parallax Plane (Position)—refers to the virtual plane associated with the surface of the display screen of a 3D display system independent of the head position or viewpoint of the user relative to the display screen Zero Parallax Offset—refers to a constant offset to the 3D scene render to move the zero-parallax plane position in the scene.

Head-tracking Scale—refers to a scaling factor used as a multiplier of the user's actual head movements. May be used to create the impression of greater or lesser movement.

Inter-pupillary Distance—refers to the distance between the left eye and right eye cameras in a 3D rendering system.

Approximately—refers to a value that is almost correct or exact within some specified tolerance. For example, approximately may refer to a value that is within 1 to 10 percent of the exact (or desired) value. It should be noted, however, that the actual threshold value (or tolerance) may be application dependent. For example, in one embodiment, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Comprising—this term is open-ended. As used in the appended claims, this term does not foreclose additional structure or steps. Consider a claim that recites: "A system comprising a display . . . . " Such a claim does not foreclose the apparatus from including additional components (e.g., a voltage source, a light source, etc.).

Configured To—various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

First, Second, etc.—these terms are used as labels for nouns that they precede, and do not imply any type of ordering (e.g., spatial, temporal, logical, etc.). For example, in a system having multiple tracking sensors (e.g., cameras), the terms "first" and "second" sensors may be used to refer to any two sensors. In other words, the "first" and "second" sensors are not limited to logical sensors 0 and 1.

Based On—this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Figure 4:
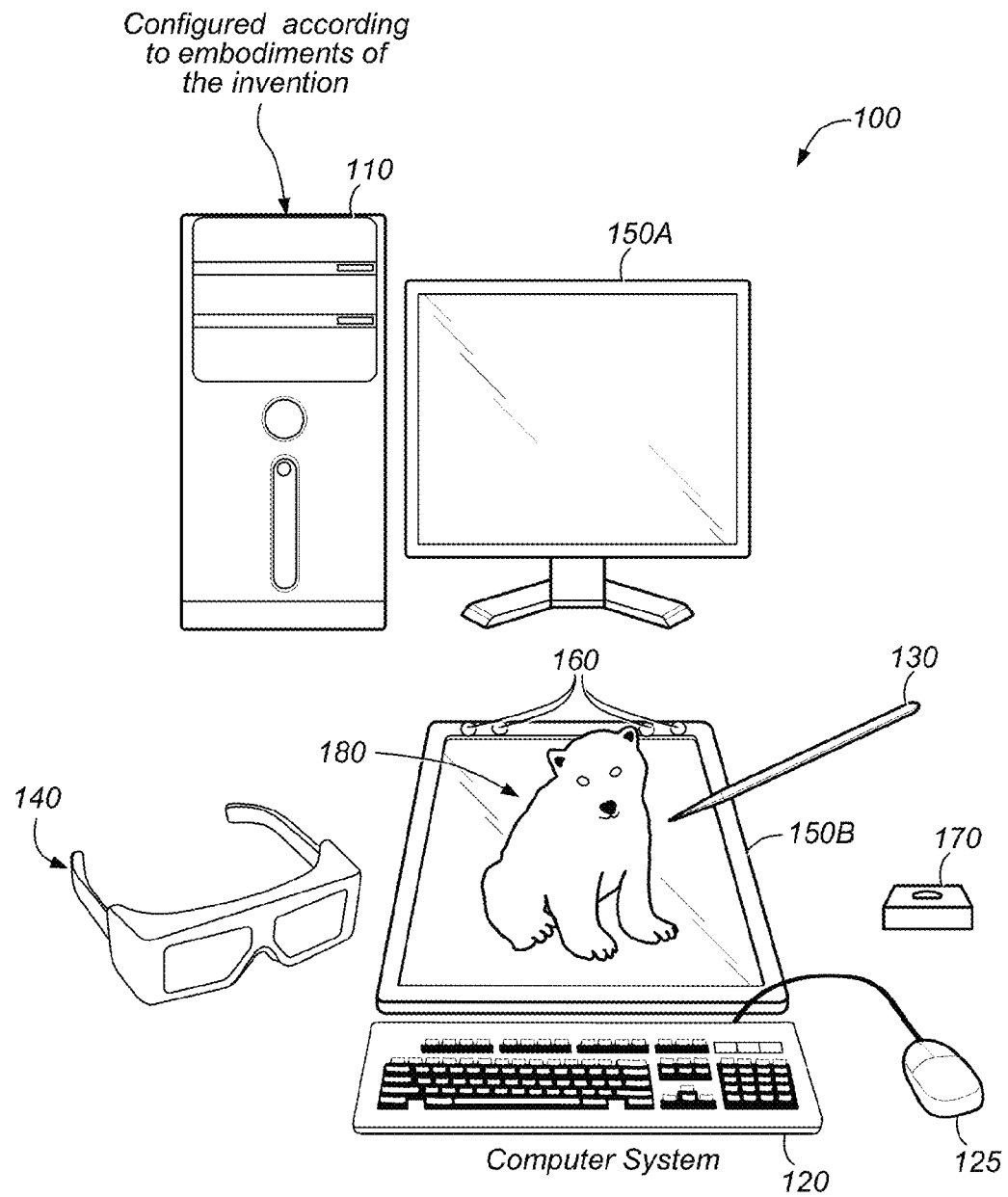
FIG. 4 illustrates a 3D stereoscopic display system according to embodiments.

FIG. 4—Exemplary System

FIG. 4 illustrates an exemplary system that may be configured to perform various embodiments described below.

In the embodiment of FIG. 4, computer system 100 may include chassis 110, display 150A and display 150B (which may collectively be referred to as display 150 or "at least one display" 150), keyboard 120, mouse 125, user control element 130, eyewear 140, at least two cameras 160, and stylus caddy 170. Note that in some embodiments, two displays 150A and 150B may not be used; instead, a single display 150 may be used in such embodiments. In various embodiments, at least one of the displays 150A and 150B may be a stereoscopic display. For example, in one embodiment, both of the displays 150A and 150B may be stereoscopic displays. Or, in other embodiments, the single display 150 may be a stereoscopic display. It is noted that a stereoscopic display may also be configured to display two-dimensional (2D) objects and may be configured to operate in a 2D mode.

The chassis 110 may include various computer components such as processors, at least one memory medium (e.g., RAM, ROM, hard drives, etc.), graphics circuitry, audio circuitry, and other circuitry for performing computer tasks, such as those described herein. The at least one memory medium may store one or more computer programs or software components according to various embodiments of the present invention. For example, the memory medium may store one or more graphics engines which are executable to perform some of the techniques described herein. In certain embodiments the graphics engine may be implemented on or by a functional unit or processing element. As used herein, and as noted in the Terms section above, the term functional unit or processing element refers to various elements or combinations of elements configured to process instructions and/or data. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

The memory medium may also store data (and/or program instructions) (e.g., implementing or specifying a computer model) representing a virtual space, which may be used for projecting a 3D scene, such as scene 180, of the virtual space via the display(s) 150. Further, one or more memory mediums may store software which are executable to perform three-dimensional spatial tracking (e.g., user view tracking, user control tracking, etc.), content processing, or other features, as described herein. Additionally, the memory medium may store operating system software, as well as other software for operation of the computer system. Various embodiments further include receiving or storing instructions and/or data implemented in accordance with the foregoing description upon a carrier medium.

As indicated above, the computer system 100 may be configured to display a three dimensional (3D) scene (e.g., via stereoscopic paired images), or 3D content, such as scene 180, using the display 150A and/or the display 150B. The computer system 100 may also be configured to display a "view" of the 3D scene using the display 150A, the display 150B, and/or another display, either fixed in position and orientation or movable in position and orientation, as described in more detail below. The "view" of the 3D scene, or content, may refer to a displayed portion of the 3D scene from a viewpoint within the 3D scene. A viewpoint within the 3D scene may be referred to as a "virtual viewpoint". The view may be stereoscopic, e.g., may be displayed on a stereoscopic display. Alternatively, the view may be monoscopic (not stereoscopic), and may be displayed on either a monoscopic display or a stereoscopic display. Note that a monoscopic image or scene displayed on a stereoscopic display may appear the same as on a monoscopic display system.

It should be noted that the embodiment of FIG. 4 is exemplary only, and other numbers of displays are also envisioned. For example, the computer system 100 may include only a single display or more than two displays, the displays may be arranged in different manners than shown, or the displays may be portable. In this particular embodiment, the display 150A is configured as a vertical display (which is perpendicular to a user's line of sight) and the display 150B is configured as a horizontal display (which is parallel or oblique to a user's line of sight). The vertical display 150A may be used (e.g., via instructions sent by a graphics engine executing in the chassis 110) to provide images which are presented according to a vertical (or central) perspective and the display 150B may be used (e.g., via instructions sent by a graphics engine executing in the chassis 110) to provide images which are presented according to a horizontal perspective. Descriptions of horizontal and vertical perspectives are provided herein. Additionally, while the displays 150 are shown as flat panel displays, in other embodiments, they may be any type of system which is capable of displaying images, e.g., projection systems. For example, display(s) 150 may be or include, for example, a CRT (cathode ray tube) monitor, a LCD (liquid crystal display) monitor, or a front projection or a back projection screen or surface with a plurality of projectors, among others. Display(s) 150 may include a light emitting diode (LED) backlight or other type of backlight.

Either or both of the displays 150A and 150B may present (display) stereoscopic images for viewing by the user. By presenting stereoscopic images, the display(s) 150 may present a 3D scene conveying depth for the user. This conveyed depth 3D (i.e., 3D) scene may be considered or referred to as an illusion or simulated 3D since the actual provided images are 2D, but the scene is conveyed in 3D via the user's interpretation of the provided images. In order to properly view the stereoscopic images (one for each eye for each image frame), the user may wear eyewear 140. Eyewear 140 may be any of anaglyph glasses, polarized glasses, shutter glasses, lenticular glasses, etc., among others. In embodiments using anaglyph glasses, images for a first eye are presented according to a first color (and the corresponding lens has a corresponding color filter) and images for a second eye are projected according to a second color (and the corresponding lens has a corresponding color filter). With polarized glasses, images are presented for each eye using orthogonal polarizations, and each lens of the eyewear has the corresponding orthogonal polarization for receiving the corresponding image. With shutter glasses, each lens is synchronized with respect to left and right eye images provided by the display(s) 150, e.g., in alternating fashion. The display may provide both polarizations simultaneously or in an alternating manner (e.g., sequentially), as desired. Thus, the left eye may be allowed to only see left eye images during the left eye image display time and the right eye may be allowed to only see right eye images during the right eye image display time. With lenticular glasses, images form on cylindrical lens elements or a two dimensional array of lens elements. Note that in some embodiments, the display may be an autostereo display and may include lenticular lenses on the display itself, thereby negating the need for complementary glasses. The stereoscopic image may be provided via optical methods, where left and right eye images are provided only to the corresponding eyes using optical means such as prisms, mirror(s), lens(es), and the like. Large convex or concave lenses can also be used to receive two separately projected images to the user.

In one embodiment, eyewear 140 may be used as a position input device to track the user view (e.g., eyepoint or point of view (POV)) of a user viewing a 3D scene presented by the system 100. For example, eyewear 140 may provide information (e.g., position, orientation, etc.) that is usable to determine the position and orientation of the point of view of the user, e.g., via triangulation. In some embodiments, the position input device may use a light sensitive detection system, e.g., may include an infrared detection system, to detect the position of the user's head to allow the user freedom of head movement. Other embodiments of the input device(s) may use the triangulation method of detecting the user point of view location, such as via one or more sensors (e.g., two cameras, such as CCD cameras) providing position and/or orientation data suitable for the head or eye tracking. In a particular embodiment, the one or more sensors may perform feature recognition to recognize features on the user's head or face to provide the position and/or orientation data suitable for the head or eye tracking. The input device(s), such as a keyboard, mouse, trackball, joystick, or the like, or combinations thereof, may be manually operated by the user to indicate the correct display of the horizontal perspective display images. However, any method for tracking the position of the user's head or point of view may be used as desired. Accordingly, the 3D scene may be rendered from the perspective (or point of view) of the user such that user may view the 3D scene with minimal distortions (e.g., since it is based on the point of view of the user). Thus, the 3D scene may be particularly rendered for (and in accordance with) the point of view of the user, using the position input device.

The relationships among the position/orientation of the display(s) 150 and the point of view of the user may be used to map a portion of the virtual space to the physical space of the system 100. In essence, the physical space and components used may be mapped to the virtual model in order to accurately render, in terms of perspective to projection, a 3D scene of the virtual space.

One or more of the user input devices (e.g., the keyboard 120, the mouse 125, the user control element 130, pointing device, user control device, etc.) may be used to interact with the presented 3D scene. For example, a user control element may be used to directly interact with the virtual objects of the 3D scene (via the viewed projected objects). Thus, the user control element 130 (shown as a stylus) or simply the user's hands may be used to directly interact with virtual objects of the 3D scene. Such direct interaction may be possible with "open space" portions of the 3D scene, i.e., the area between the display and the user. Thus, at least a portion of the 3D scene may be presented in this "open space", which is in front of or otherwise outside of the at least one display. In some embodiments, at least a portion of the 3D scene may appear as a hologram above the surface of the display 150. For example, when the horizontal display 150B is used, the 3D scene may be seen as hovering above the horizontal display. Note that when presenting the 3D scene on the horizontal display, the position and orientation of the display to the user's viewpoint may be correlated to the frustum's render plane when rendering the 3D scene. Additionally, it should be noted, that a portion of the 3D scene may also be presented as appearing behind the display surface, which is not in "open space". Thus, "open space" refers to a space which the user is able to freely move in and interact with (e.g., where the user is able to place his hands in the space), as opposed to a space the user cannot freely move in and interact with (e.g., where the user is not able to place his hands in the space, such as below the display surface). However, in the case where the user may not place his hands in the space, the user may use a scene generating virtual extension that appears to the user to be able to virtually manipulate virtual objects not appearing the "open space". Thus, "open space" may be considered to be a "hands-on volume" as opposed to an "inner-volume", which may be under the surface of the display(s). Thus, the user may interact with virtual objects in the open space because they appear as being proximate to the user's own physical space. Said another way, the inner volume is located behind (or under) the viewing surface, and so presented objects appear to be inside the physical viewing device. Thus, objects of the 3D scene presented within the inner volume do not share the same physical space with the user and the objects therefore cannot be directly and physically manipulated by hands or hand-held tools such as user control element 130 shown as a stylus. Rather, they may be manipulated indirectly, e.g., via a computer mouse, a joystick, or virtual representations of hands, handheld tools, or a stylus.

In some embodiments, system 100 may include one or more sensors 160. The one or more sensors 160 may be included in a point of view (POV) tracking system. In certain embodiments, the one or more sensors 160 may be affixed to one or more reference points attributable to or with respect to, the display and may provide a correlation of position and orientation of what is tracked to the position and orientation of the display. FIG. 4 illustrates an embodiment using four cameras 160. For instance, two of the four cameras 160 may be used to sense a user view (e.g., point of view) and the other two cameras 160 may be used to sense a user control element (e.g., pointing device, stylus, hand, glove, one or more fingers, etc.). Sensors 160 may be used to image a user of system 100, track a user's movement, or track a user's head or eyes, among other contemplated functions. In one embodiment, cameras 160 may track a position and/or an orientation of user control element 130. The information regarding the position and/or orientation of the user control element 130 provided by the one or more sensors 160 may be used in conjunction with other positional information of the system (e.g., an accelerometer and/or gyroscope within the stylus itself) to perform more precise 3D tracking of the user control element 130. The one or more sensors 160 may be spatially separated from one another and placed in a position to view a volume that encompasses the view frustum, i.e., where a user will view stereo imagery. Sensors 160 may also be far enough apart from each other to provide for a separation of view for a true three-axis triangulation determination. System 100 may also include a caddy 170 to store user control element 130. Caddy 170 may also be used to calibrate the orientation of the stylus to a known roll, pitch, and yaw, and so may be in a fixed position relative to cameras 160.

In one embodiment, the system 100 may be configured to couple to a network, such as a wide area network, via an input. The input may be configured to receive image data over the network from a system similar to system 100. In other embodiments, a POV tracking system may include cameras 160. Cameras 160 may be configured to provide visual information regarding a user such that a POV, e.g., the position and orientation, of the user may be determined. However, it should be noted that any type of various POV tracking techniques or devices may be used as desired. Note that as used herein, point of view (POV) of a user refers to the perspective or POV from which a user optically views an object or image, i.e., a user's visual POV, and thus is defined with respect to the display device of the system. In some embodiments, the POV may be a 6 degree of freedom (6DOF) POV, e.g., three position coordinates and three orientation coordinates, although any POV may be used as desired, e.g., three position coordinates and two or three orientation coordinates, and so forth.

Note that in some embodiments, the POV tracking system may rely at least in part on the components of chassis 110 to determine the POV, e.g., via execution of one more programs on a processor or functional unit of chassis 110, although in other embodiments the POV tracking system may operate independently, e.g., may have its own processor or functional unit.

In certain embodiments, the system may include components implementing a perspective based image capture system, for capturing images of target object at a location remote from the system. For example, the perspective based image capture system may include an input configured to couple to a network for receiving information regarding a point of view (POV) from a POV tracking system at a remote location. The information regarding the POV may indicate a position and/or orientation of a remote user. The perspective based image capture system may further include another image capture system for capturing images of a target object. More specifically, the image capture system may be configured to capture one or more images from a first perspective based on the information regarding the POV received by the input.

The user may be able to specify or otherwise manipulate a virtual viewpoint within the 3D scene presented by the display(s) 150. A view of the 3D scene may be presented based on the virtual viewpoint, either by one or more of the display(s) 150 or another display, as desired. This view of the 3D scene may be stereoscopic or monoscopic, as desired. Note that in some embodiments, the virtual viewpoint may change as a user's eyepoint(s) changes. Additionally, the user's eyepoint(s) may be tracked by a tracking system as described above.

A 3D scene generator (e.g., content processing system) stored and executed in the chassis 110 may be configured to dynamically change the displayed images provided by the display(s) 150. More particularly, the 3D scene generator may update the displayed 3D scene based on changes in the user view, user control (e.g., manipulations via the user input devices), etc. Such changes may be performed dynamically at run-time, and may be performed in real-time. The 3D scene generator may also keep track of peripheral devices (e.g., eyewear 140) and/or user control elements (e.g., user control element 130) to ensure synchronization between the peripheral devices and/or the user control elements, the frustum, the frustum render plan, the rendering, and the corresponding displayed images. The system may further include a calibration unit to ensure proper mapping of the peripheral device to the display images and proper mapping between the projected rendered images and the virtual images stored in the memory of the chassis 110.

Thus, the system 100 may present a 3D scene which the user may virtually interact with in real time. The system may comprise real-time electronic display(s) 150 that may present or convey projected images in the open space based on the perspective of the user, and a peripheral device or user control element 130 that may allow the user to interact with the 3D scene with hand controlled or hand-held tools. The system 100 may also include means to manipulate the displayed image such as magnification, zoom, rotation, movement, and even display a new image. However, as noted above, in some embodiments, the system may facilitate such manipulations via the user's hands, e.g., without hand-held tools.

Further, while the system 100 is shown as including horizontal display 150B since it simulates the user's visual experience with the horizontal ground, other viewing surfaces may offer a similar 3D illusion experience. For example, the 3D scene may appear to be hanging from a ceiling by projecting the horizontal perspective images onto a ceiling surface, or may appear to be floating from a wall by projecting horizontal perspective images onto a vertical wall surface, or may be a user handheld device, where the scene may either appear to be moving in space with the movement of the portable device or the portable device may appear to be moved away, thereby passing by the scene. More generally, any other variations in display orientation and perspective (or any other configuration of the system 100) may be used as desired.

Thus, in certain embodiments, the system may include instructions stored on a memory medium of the system and executable by a processor or functional unit of the system to perform navigation of a 3D scene via tracked user head position. As discussed above, the 3D stereoscopic system may include components or systems which may allow the point of view (POV) of the user to be tracked. Accordingly, in one embodiment, software or a software module may include a user head tracking navigation mode. The head tracking navigation mode may be enabled by a variety of triggers. For example, the head tracking navigation mode may be enabled at startup of the 3D stereoscopic system or through some form of user interaction that may trigger startup of the head tracking navigation mode. The trigger may be based on the selection of the head tracking navigation mode via a user interface displayed within a 3D scene, such as a menu. Additionally, the trigger may be external to the 3D scene. Thus, the trigger may be an input device such as a switch or button of a user control element. The user control element may be a user input device, such as a stylus. Note that the system may include more than one trigger for enabling the head tracking navigation mode.

Once the head tracking navigational mode has been enabled, a reference point of view (POV) may be established via a head tracking, or POV tracking, system as described above. The reference POV may include a reference user head position and a reference user head orientation. Thus, via the POV tracking system of the 3D stereoscopic system, user head POV may be tracked relative to the reference POV. In other words, tracking the user's head POV may monitor user head positional displacements and user head angular rotations relative to the reference POV.

Further, in response to tracking the user's head POV, the system may be configured to adjust a camera POV used to render the 3D stereoscopic scene. The adjustment may be based on a non-linear mapping between changes in the camera POV and the user head positional displacements and user head angular rotations relative to the reference POV. In other words, the non-linear mapping may be based on changes in user head position and orientation relative to a reference position and orientation of the user's head.

The non-linear mapping may include a mapping of user head positional displacements relative to the reference POV to translational movements in the camera view. Further, the non-linear mapping may include a mapping of user head angular rotations relative to the reference POV to rotations in the camera POV.

In one embodiment the non-linear mapping may be used to adjust one or more of various 3D stereoscopic rendering variables, including for example, but not limited to, scaling, such as the world scale, stereo level, field of view, and/or parallax offset, among others. In some embodiments, the adjustments to the one or more stereo variables may be optimized to maintain optimum viewer comfort. Note that in certain embodiments, the adjustments may be dynamic and may occur in real-time. In other words, based on the head position driven navigation of the scene, dynamic adjustments to the one or more stereo variables may be made. Accordingly, by adjusting, or changing, the stereo settings in response to the head position and the head-driven navigation, the scene may be maintained with an optimal viewing comfort. Further, visual artifacting at the near clip plane may be minimized or removed.

Hence, in some embodiments stereo settings are programmatically chosen to best represent the virtual appearance given the navigating activity and the breadth of the scene to be rendered.

FIGS. 5A-5C illustrate changes to a frustum based on changes in user POV according to embodiments. As illustrated in FIG. 5A, a first frustum 606 may correspond to a first POV 600 of user 602 as user 602 interacts with display 604 of a 3D stereoscopic system. Note that the 3D stereoscopic system may be similar to or the same as the 3D stereoscopic system described above in reference to FIG. 4. Thus, for example, 3D stereoscopic system 604 may render a 3D scene on display 604 that may be viewable by user 602 at POV 600. As illustrated in FIG. 5B, as user 602 moves away from display 604, user 602 may have a second POV 610 and a corresponding second frustum 616. Similarly, as illustrated in FIG. 5C, user 602 may move even further away from display 604 resulting in a third POV 620 and a corresponding third frustum 626. Thus, according to some embodiments, and as discussed below with reference to FIG. 6, as the user moves further away from the display, and the user's corresponding frustum changes, a world scale may be dynamically adjusted, effectively allowing the user to zoom out by changing head position.

Figure 6:
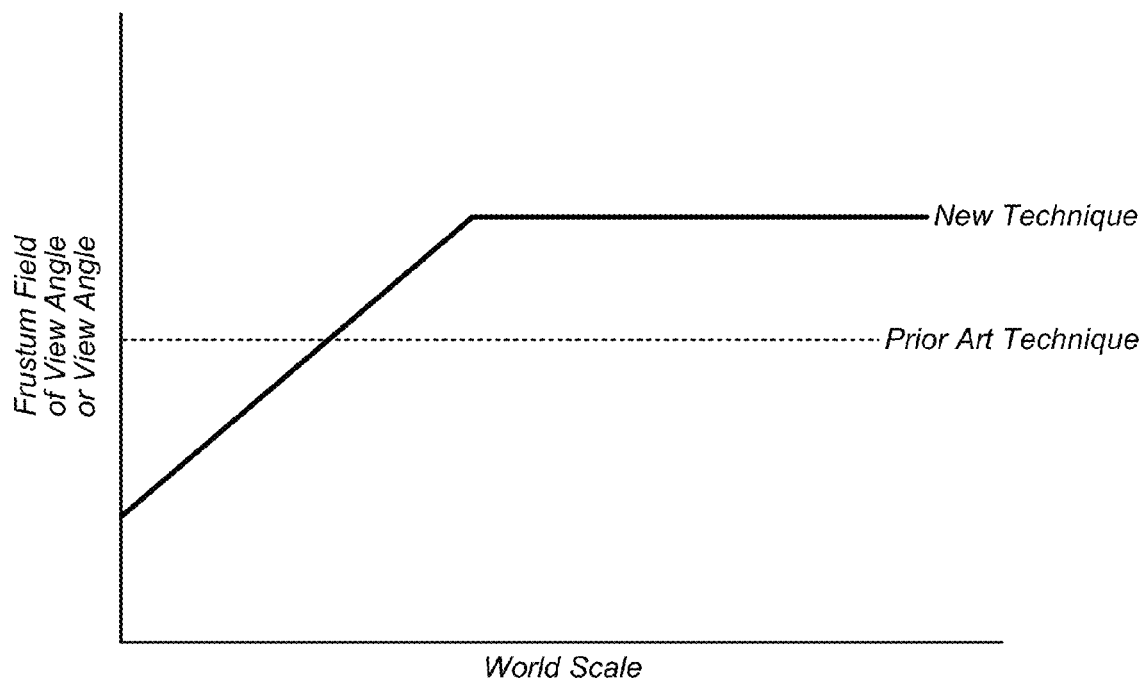
FIG. 6 illustrates an example of an embodiment of the non-linear mapping with respect to frustum field of view angle as the world scale of the 3D scene is adjusted.

FIG. 6 illustrates an example of an embodiment of the non-linear mapping with respect to frustum field of view angle as the world scale of the 3D scene is adjusted. As shown, compared to the prior art, as a user moves the user POV further away from the display screen, as illustrated in FIGS. 5A-5C, the frustum field of view angle may be increased, and the world scale may be dynamically adjusted, effectively allowing the user to zoom out. In other words, the movement of the user's head away from zero parallax plane of the scene may cause the system to adjust the rendering camera POV to allow for rapidly achieving an overall "birds-eye" view of the 3D scene. Thus, by changing the world scale, navigation can automatically move larger distances as the user pulls back whereas in the prior art, the world scale remains constant as the frustum field of view angle is increased.

For example, as a user moves the user POV away from the screen (further back from the screen as illustrated in FIGS. 5B and 5C), the camera POV may be moved farther from the scene. Thus, for example, if the scene were a baseball stadium, the user could alter the camera POV from being positioned in the front row, to, as the user POV moves further from the display, the camera POV being positioned in the top row of the stadium. Note that as the camera POV is positioned further from the action (e.g., baseball field), the effect of head motion, such as moving the head left or right, on the perceived image may be lessened. Thus, in certain embodiments this may be compensated for by adjusting the world scale to make the virtual world appear smaller, resulting in the user head movement still having a visual affect.

Although the embodiment depicted in FIG. 6 illustrates the non-linear mapping of world scale to frustum field of view angle (camera POV), non-linear mapping of other 3D stereoscopic rendering variables to frustum field of view angle may aid in head tracked navigation. For example, stereo level, which may affect the zone of comfort (coupled zone) between the user and the display, may be dynamically lowered when the user navigates to a position that has a deeper perceived depth of field. Additionally, in certain embodiments, the field of view may be non-linearly adjusted, via the rendering camera POV, to create a "telescopic lens" or "scope" effect as the user focuses in on an object in the scene. Additionally, the stereo level may be dynamically changed, i.e., in real-time, to ensure that the 3D scene presented to the user remains within the coupled zone.

Further, in some embodiments, the zero parallax offset, which may affect the perceived depth of objects from the rendering screen, may be dynamically adjusted to maintain the feeling that the screen is a "window", by re-positioning the zero parallax plane to place the scene at an optimal viewing depth. Note that in some embodiments, the adjustment of the zero parallax plane may be non-linearly mapped to the frustum field of view angle.

In certain embodiments, there may be a non-linear relationship between the near plane, or near-clip plane, of the frustum field of view and user head POV. In such embodiments, the near-clip plane may be dynamically adjusted, e.g., in real-time, to fall at a constant plane within the scene in contrast to the prior art constant distance from the camera. This may allow minor changes in user head position to not change the visually perceived clip plane. In certain embodiments, the near-clip plane may be dynamically adjusted via adjustment to a head-tracking scale.

In further embodiments, the rate of the change of the camera POV may be non-linearly mapped to changes in user head POV, i.e., changes in user head position and orientation. For example, if the user POV is moved closer to display as if to look closer to the objects within the 3D scene, the corresponding projection of the scene may correlate to a fraction of the rate of change of the head position.

Figure 7:
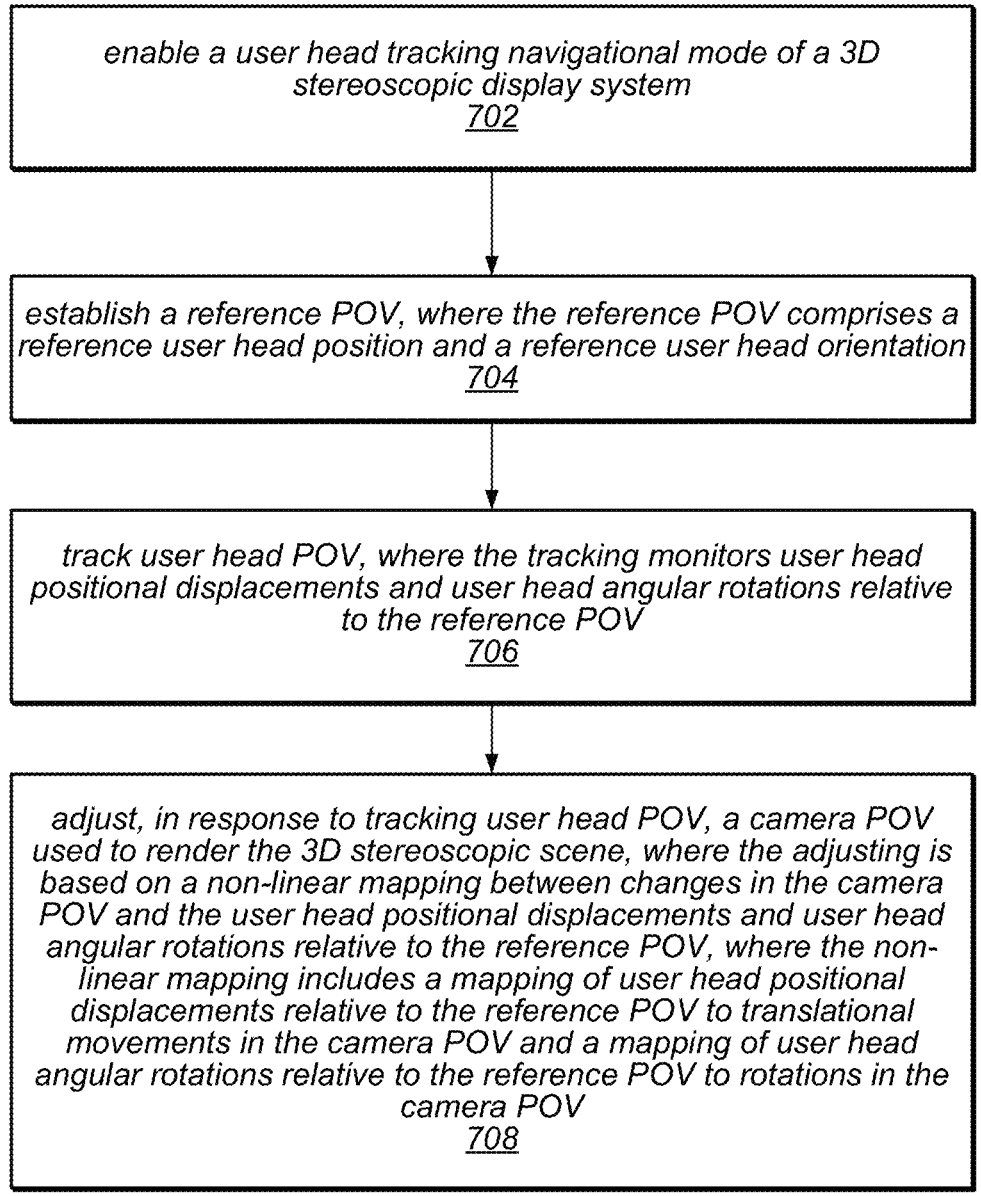
FIG. 7 illustrates an exemplary embodiment of a method for navigating a three dimensional (3D) stereoscopic scene displayed via a 3D stereoscopic display system according to embodiments.

FIG. 7: Block Diagram of a Method for Non-Linear Navigation of a 3D Scene

FIG. 7 illustrates an exemplary embodiment of a method for navigating a three dimensional (3D) stereoscopic scene displayed via a 3D stereoscopic display system. The method shown in FIG. 7 may be used in conjunction with any of the computer systems, devices, or software shown in, or described in reference to, the above Figures, among other systems, devices, and software. In various embodiments, some of the method elements shown may be performed concurrently, in a different order than shown, or may be omitted. Additional method elements may also be performed as desired. As shown, this method may operate as follows.

In 702, a user head tracking navigational mode of a 3D stereoscopic display system may be enabled. The 3D stereoscopic display system may be similar to, or include features and components similar to, the 3D stereoscopic display systems described above in reference to FIGS. 4-6. In certain embodiments, the user head tracking navigational mode may be enabled via user input to the 3D stereoscopic display system. In one embodiment, the user input may be received via a user control element, such as a stylus. In another embodiment, the user input may be received via a user interface displayed within the 3D stereoscopic scene. Of course, in other embodiments, any type of user input means may be used as desired.

In 704, a reference point of view (POV) may be established. Note that a POV generally refers to a position and an orientation, and thus the reference POV may include a reference position and a reference orientation. For example, a POV may be a viewpoint or eyepoint, generally of a user, but may also be a viewpoint of an optical device, such as a camera, or the viewpoint of a virtual device, such as a virtual camera. Additionally, a POV may define a frustum view angle, or frustum viewing angle. The POV is generally a means to capture or encode a relationship between two or more 6 (or possibly fewer) degree of freedom objects. In a typical application of the present techniques, a user's pair of eyes or head (view) are positioned in any X, Y, Z position and/or pitch, yaw, roll orientation with respect to a display device, e.g., a monitor screen, which may have its own X, Y, Z position and/or pitch, yaw, roll orientation.

In 706, a POV of the user's head may be tracked. In some embodiments, the tracking may be via a user head tracking system as described above in reference to FIG. 4. The tracking may monitor both positional displacements of the user's head and angular rotations of the user's head relative to the reference POV established in step 704.

In 708, a camera POV used to render the 3D stereoscopic scene may be adjusted. Note that the camera POV may correspond, or correlate to, a frustum, or frustum field of view angle, used to render the 3D stereoscopic scene. In one embodiment, the adjustment of the camera POV may be based on a non-linear mapping between changes, or rates of change, of the camera POV and displacements, or rates of displacement, of user head position and rotations, or rates of rotation, of user head angle (i.e., orientation), with respect to, or relative to, the reference POV. In other words, the camera POV used to render the 3D stereoscopic scene may be adjusted non-linearly with respect to movements, or rates of movements, of the user's head with respect to a reference POV. Thus, in certain embodiments, the non-linear mapping may include a mapping of user head positional displacements relative to the reference POV to translational movements in the camera POV and a mapping of user head angular rotations relative to the reference POV to rotations in the camera POV. Further, in some embodiments, the mapping may also include a mapping of rate of change of user head positional displacements relative to the reference POV to rate of change of translational movements in the camera POV and a mapping of rate of change of user head angular rotations relative to the reference POV to rate of change of rotations in the camera POV.

In one particular embodiment, adjusting the camera POV may also include adjusting one or more 3D stereoscopic rendering variables. In such embodiments, the adjustment may also be based on a non-linear mapping of each of the one or more 3D stereoscopic rendering variables to the camera POV, where the 3D stereoscopic rendering variables may include a world scale variable, a stereo level variable, a zero parallax offset variable, and/or a head-tracking scale variable, among others.

Note that in some embodiments, the mapping may be performed via a correlated table of mapped variables. In other embodiments, the mapping may be performed via a continuous function. In certain embodiments, the mapping may be performed via a discontinuous function.

It should be noted that the above-described embodiments are exemplary only, and are not intended to limit the invention to any particular form, function, or appearance. Moreover, in further embodiments, any of the above features may be used in any combinations desired. In other words, any features disclosed above with respect to one method or system may be incorporated or implemented in embodiments of any of the other methods or systems.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for navigating a three dimensional (3D) stereoscopic scene displayed via a 3D stereoscopic display system, the method comprising:
    enabling a user head tracking navigational mode of the 3D stereoscopic display system;
    establishing a reference point of view (POV), wherein the reference POV comprises a reference user head position and a reference user head orientation;
    tracking user head POV, wherein said tracking monitors user head positional displacements and user head angular rotations relative to the reference POV; and
    adjusting, in response to said tracking, a camera POV used to render the 3D stereoscopic scene, wherein said adjusting is based on a non-linear mapping between changes in the camera POV and the user head positional displacements and user head angular rotations relative to the reference POV, and wherein the non-linear mapping comprises:
        a mapping of user head positional displacements relative to the reference POV to translational movements in the camera POV; and
        a mapping of user head angular rotations relative to the reference POV to rotations in the camera POV.

2. The method of claim 1, wherein said enabling comprises:
    receiving user input enabling the head tracking navigational mode via one or more of:
        a user interface displayed within the 3D stereoscopic scene; or
        an input device of the 3D stereoscopic display system.

3. The method of claim 2, wherein the input device is a user control element.

4. The method of claim 1, wherein said adjusting further comprises adjusting one or more 3D stereoscopic rendering variables, and wherein said adjusting is further based on a non-linear mapping of each of the one or more 3D stereoscopic rendering variables to the camera POV.

5. The method of claim 4, wherein the one or more 3D stereoscopic rendering variables comprise one or more of:
    a world scale variable;
    a stereo level variable;
    a zero parallax offset variable; or
    a head-tracking scale variable.

6. The method of claim 1, wherein the non-linear mapping further comprises:
    a mapping of rate of change of user head positional displacements relative to the reference POV to rate of change of translational movements in the camera POV; and
    a mapping of rate of change of user head angular rotations relative to the reference POV to rate of change of rotations in the camera POV.

7. The method of claim 1, wherein said adjusting occurs in real-time.

8. The method of claim 1, wherein the camera POV corresponds to a frustum field of view angle.

9. A non-transitory computer readable memory medium storing programming instructions for navigating a three dimensional (3D) stereoscopic scene displayed via a 3D stereoscopic display system, wherein the programming instructions are executable by a processor to:
- enable a user head tracking navigational mode of the 3D stereoscopic display system;
- establish a reference point of view (POV), wherein the reference POV comprises a reference user head position and a reference user head orientation;
- track user head POV, wherein said tracking monitors user head positional displacements and user head angular rotations relative to the reference POV; and
- adjust, in response to tracking user head POV, a camera POV used to render the 3D stereoscopic scene, wherein said adjusting is based on a non-linear mapping between changes in the camera POV and the user head positional displacements and user head angular rotations relative to the reference POV, and wherein the non-linear mapping comprises:
  - a mapping of user head positional displacements relative to the reference POV to translational movements in the camera POV; and
  - a mapping of user head angular rotations relative to the reference POV to rotations in the camera POV.

10. The non-transitory computer readable memory medium of claim 9, wherein to enable a user head tracking navigational mode of the 3D stereoscopic display system the programming instructions are further executable by a processor to:
- receive user input enabling the head tracking navigational mode via one or more of:
  - a user interface displayed within the 3D stereoscopic scene; or
  - an input device of the 3D stereoscopic display system.

11. The non-transitory computer readable memory medium of claim 10, wherein the input device is a user control element.

12. The non-transitory computer readable memory medium of claim 9, wherein to adjust the camera POV the programming instructions are further executable by a processor to adjust one or more 3D stereoscopic rendering variables, and wherein said adjusting is further based on a non-linear mapping of each of the one or more 3D stereoscopic rendering variables to the camera POV.

13. The non-transitory computer readable memory medium of claim 12, wherein the one or more 3D stereoscopic rendering variables comprise one or more of:
- a world scale variable;
- a stereo level variable;
- a zero parallax offset variable; or
- a head-tracking scale.

14. The non-transitory computer readable memory medium of claim 9, wherein the non-linear mapping further comprises:
- a mapping of rate of change of user head positional displacements relative to the reference POV to rate of change of translational movements in the camera POV; and
- a mapping of rate of change of user head angular rotations relative to the reference POV to rate of change of rotations in the camera POV.

15. The non-transitory computer readable memory medium of claim 9, wherein said adjusting is executed in real-time.

16. The non-transitory computer readable memory medium of claim 9, wherein the camera POV corresponds to a frustum field of view angle.

17. A system for navigating a three dimensional (3D) stereoscopic scene displayed via a 3D stereoscopic display system, comprising:
- a 3D stereoscopic display system, comprising:
  - a display screen;
  - a user head tracking system; and
  - a functional unit coupled to the user head tracking system and the display screen,
    wherein the functional unit is configured to:
    - enable a user head tracking navigational mode of the 3D stereoscopic display system, wherein the user's head is tracked via the user head tracking system;
    - establish a reference point of view (POV), wherein the reference POV comprises a reference user head position and a reference user head orientation;
    - track user head POV via the user head tracking system, wherein said tracking monitors user head positional displacements and user head angular rotations relative to the reference POV; and
    - adjust, in response to tracking user head POV, a camera POV used to render the 3D stereoscopic scene via the display screen, wherein said adjusting is based on a non-linear mapping between changes in the camera POV and the user head positional displacements and user head angular rotations relative to the reference POV, and wherein the non-linear mapping comprises:
      - a mapping of user head positional displacements relative to the reference POV to translational movements in the camera POV; and
      - a mapping of user head angular rotations relative to the reference POV to rotations in the camera POV.

18. The system of claim 17, further comprising:
- an input device;
- wherein to enable a user head tracking navigational mode of the 3D stereoscopic display system the functional unit is further configured to:
  - receive user input enabling the head tracking navigational mode via one or more of:
    - a user interface displayed within the 3D stereoscopic scene; or
    - the input device.

19. The system of claim 17, wherein to adjust the camera POV the functional unit is further configured to adjust one or more 3D stereoscopic rendering variables, and wherein said adjusting is further based on a non-linear mapping of each of the one or more 3D stereoscopic rendering variables to the camera POV.

20. The system of claim 17, wherein the non-linear mapping further comprises:
- a mapping of rate of change of user head positional displacements relative to the reference POV to rate of change of translational movements in the camera POV; and
- a mapping of rate of change of user head angular rotations relative to the reference POV to rate of change of rotations in the camera POV.

* * * * *